United States Patent
Soman et al.

(10) Patent No.: US 12,169,554 B2
(45) Date of Patent: Dec. 17, 2024

(54) HYPERVISOR ASSISTED VIRTUAL MACHINE CLONE AUTO-REGISTRATION WITH CLOUD

(71) Applicant: VMware LLC, Palo Alto, CA (US)

(72) Inventors: Leena Shuklendu Soman, Pune (IN); Bharath Kumar Chandrasekhar, Sunnyvale, CA (US); Shirish Vijayvargiya, Pune (IN); Vasantha Kumar Dhanasekar, Pune (IN); Vaibhav Mohan Rekhate, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 207 days.

(21) Appl. No.: 17/701,768

(22) Filed: Mar. 23, 2022

(65) Prior Publication Data
US 2023/0222210 A1     Jul. 13, 2023

(30) Foreign Application Priority Data
Jan. 8, 2022   (IN) .............................. 202241001119

(51) Int. Cl.
*G06F 21/53*     (2013.01)
*G06F 9/455*     (2018.01)

(52) U.S. Cl.
CPC .......... *G06F 21/53* (2013.01); *G06F 9/45558* (2013.01); *G06F 2009/45562* (2013.01); *G06F 2009/45587* (2013.01)

(58) Field of Classification Search
CPC .............. G06F 21/53; G06F 9/45558; G06F 2009/45562; G06F 2009/45587; G06F 2009/45591; G06F 2009/45595
(Continued)

(56) References Cited

U.S. PATENT DOCUMENTS

2009/0241113 A1* 9/2009 Seguin .................. G06F 1/3209
                                                                  718/1
2010/0122248 A1* 5/2010 Robinson ................ G06F 9/485
                                                                  718/1
(Continued)

OTHER PUBLICATIONS

VMware, "Endpoint Standard: How to Fix Duplicate Device IDs on VDI Clones with RepCLI.", https://community.carbonblack.com/t5/Knowledge-Base/Endpoint-Standard-How-to-Fix-Duplicate-Device-IDs-on-VDI-Clones/ta-p/64173, 2 pages.

*Primary Examiner* — Jacob Lipman
(74) *Attorney, Agent, or Firm* — King Intellectual Asset Management

(57) ABSTRACT

A method for automatically reregistering a clone virtual machine with a cloud security monitoring service is provided. The method generally includes detecting a connection between a cloud agent running in a virtual machine on a host and a hypervisor module on the host. In response to detecting the connection, the cloud agent queries the hypervisor module for one or more first identifiers of the virtual machine. The method generally includes checking a database, by the cloud agent, for one or more second identifiers stored in the database matching the one or more first identifiers received from the hypervisor module and, based on finding no second identifiers stored in the database matching the one or more first identifiers, sending a request to the cloud security monitoring service to register the virtual machine with the cloud security monitoring service.

20 Claims, 6 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2014/0201356 A1* | 7/2014 | Hung | H04L 41/046 709/224 |
| 2014/0201572 A1* | 7/2014 | Dancy | G06F 16/50 714/37 |
| 2016/0378527 A1* | 12/2016 | Zamir | G06F 9/45558 711/162 |
| 2018/0196686 A1* | 7/2018 | Wellum | G06F 11/34 |

* cited by examiner

HYPERVISOR ASSISTED VIRTUAL MACHINE CLONE AUTO-REGISTRATION WITH CLOUD

RELATED APPLICATION

Benefit is claimed under 35 U.S.C. 119 (a)-(d) to Foreign application Ser. No. 202241001119 filed in India entitled "HYPERVISOR ASSISTED VIRTUAL MACHINE CLONE AUTO-REGISTRATION WITH CLOUD", on Jan. 8, 2022, by VMware, Inc., which is herein incorporated in its entirety by reference for all purposes.

INTRODUCTION

Virtual desktop infrastructure (VDI) is a desktop virtualization technology wherein virtual images of a desktop, running on a host in a remote data center, are delivered over a network to a client device (e.g., a personal computer (PC) or mobile device), using a remote display protocol, for display remotely at the client device. In particular, images of the remote desktop operating system (OS), or its applications, are captured and sent (e.g., as a stream of pixels) to the client device which allows a user of the client device to interact with the remote desktop OS, and its applications, as if they were running locally. The user may interact with the remote desktop using peripheral devices (e.g., a keyboard and/or a mouse) associated with the client device. Inputs by the user at the client device, using such peripheral devices, are captured by a VDI client (e.g., a user-side interface of the remote desktop) of the client device and redirected from the client device to a VDI agent of the remote desktop.

VDI uses virtual machines (VMs) to provide and manage virtual desktops. Virtualization is a process whereby software is used to create an abstraction layer over computer hardware that allows the hardware elements of a single computer to be divided into multiple virtual computers. The software used is called a hypervisor—a small layer that enables multiple OSs to run alongside each other, sharing the same physical computing resources. When a hypervisor is used on a physical server (also known as a bare metal server or a host) in a data center, the hypervisor allows the physical computer to separate its OS and applications from its hardware thereby enabling the creation and management of VMs. The result is that each VM contains a guest OS, a virtual copy of the hardware that the OS requires to run, and an application and its associated libraries and dependencies. Other types of virtual computing instances (VCIs) may also be used similarly as VMs.

VMs hosting a remote desktop can either be persistent or non-persistent. A non-persistent VM is created at logon and destroyed at logoff. A non-persistent VM uses instant cloning technology in which the parent's running state is replicated as-is on the clones and the clone machine is unaware that it is indeed a new machine. For seamless VM security, VM clones should be protected as soon as they are created.

Today's enterprises rely on defense-in-depth mechanisms (e.g., multiple layers of security defense controls used to provide redundancy in the event a security control fails) to protect endpoint computing devices from malware infection. Malware is malicious software that, for example, disrupts network operations and gathers sensitive information on behalf of an unauthorized third party. Targeted malware may employ sophisticated methodology and embed in the target's infrastructure to carry out undetected malicious activities. In particular, once malware gains access to an endpoint, the malware may attempt to control the device and use lateral movement mechanisms to spread to other endpoints and critical assets of an enterprise.

Anti-malware solutions are employed to detect and prevent malware from infiltrating such endpoint computing devices in a system using various techniques, such as, sandboxing of malware samples, signature based detection of known malwares, and blocking of malwares from spreading in the environment. Modern anti-virus solutions are generally software as a service (SaaS) based. In cloud based anti-virus solutions, a cloud agent (also referred to herein as the "sensor") running on an endpoint (e.g., on a VM running on a host in a data center) and sends events to a cloud security monitoring service, which may be a cloud backend service. The cloud security monitoring service decides whether to allow or deny a network connection and publishes appropriate security policies and rules to the cloud agent, which the cloud agent enforces on the endpoint.

An example cloud security monitoring service is Carbon Black cloud made commercially available from VMware, Inc. of Palo Alto, California. Carbon Black cloud provides security software that is designed to detect malicious behavior and help prevent malicious files from attacking an organization. A Carbon Black sensor pulls information into a centralized data analytics platform that provides the customer with analysis, alerts, and intelligence on vulnerabilities, suspicious activity, and blocked malware. The Carbon Black sensor ingests a variety of data sources that are processed and stored as cybersecurity events, behaviors, and system state metrics that can be analyzed, visualized, and alerted upon for anomaly detection, incident investigation, and remediation of cybersecurity risks.

To register (e.g., at startup of the agent) with the cloud security monitoring service, the agent on the endpoint registers with the cloud security monitoring service. For example, the agent sends the cloud security monitoring service a device identifier (ID) associated with the agent (e.g., a "unique_deviceID") and may send an additional parameter (e.g., a "company_code"). In response, the cloud security monitoring service assigns a unique registration ID (e.g., a "registrationId") to the agent when the registration is successful. This pair of the device ID and the unique registration ID assigned to the agent (e.g., "<unique_deviceID, registrationID>") is used as the identity of the agent in all further communication with the cloud security monitoring service. For successful operations, the agent should be uniquely identified, even for VM clones.

A VM clone is an exact copy of the parent VM (also referred to as the "golden image"). When a VM clone is created, the agent is unaware that the agent is now running on a new VM. As a result, the VM clone continues to communicate with the cloud security monitoring service using the same device ID and registration ID pair as the parent. When multiple VMs use the same ID, the cloud security monitoring service cannot differentiate between the parent and clone VMs, which can lead to erroneous event reporting and remediation. For example, one or more events or alarms from the VM clone (or clones) may be incorrectly associated with the parent VM by the cloud security monitoring service. Accordingly, techniques for registering clone VMs with a cloud security monitoring service may be desirable.

It should be noted that the information included in the Background section herein is simply meant to provide a reference for the discussion of certain embodiments in the Detailed Description. None of the information included in this Background should be considered as an admission of prior art.

SUMMARY

The technology described herein provides a method for registering with a cloud security monitoring service. The method generally includes detecting a connection between a cloud agent running in a virtual machine on a host and a hypervisor module on the host. The method generally includes, in response to detecting the connection, querying the hypervisor module, by the cloud agent, for one or more first identifiers of the virtual machine. The method generally includes checking a database, by the cloud agent, for one or more second identifiers stored in the database matching the one or more first identifiers received from the hypervisor module and, based on finding no second identifiers stored in the database matching the one or more first identifiers, sending a request to the cloud security monitoring service to register the virtual machine with the cloud security monitoring service.

Further embodiments include a non-transitory computer-readable storage medium storing instructions that, when executed by a computer system, cause the computer system to perform the method set forth above, and a computer system including at least one processor and memory configured to carry out the method set forth above.

DETAILED DESCRIPTION

Aspects of the present disclosure introduce hypervisor assisted auto-registration of VM clones with a cloud security monitoring service, which may be cloud backend service. Embodiments provided herein allow the cloud security monitoring service to uniquely identify cloned VMs to differentiate between VM clones and the parent. Though certain aspects are discussed with respect to cloned VMs used for a VDI, it should be noted that the techniques discussed herein may similarly be applied to any suitable VCIs. In some embodiments, when a VM clone is created, a cloud agent detects that it is associated with a new clone VM and triggers an auto-registration with the cloud security monitoring service using a new device ID to obtain a new registration ID to uniquely identify the clone VM. In some embodiments, the cloud agent establishes a connection with a host module on the host hypervisor and queries identifiers from the host module. Because the host module is located on the host hypervisor, the host module can differentiate between a parent and clone VM running on the host and the host module will provide different identifiers for the parent and VM clones to the cloud agent. The cloud agent persists the fetched identifiers to memory and uses the identifiers in messages to the cloud security monitoring service.

The persisted identifiers are used to determine whether a VM is a golden VM or a clone VM. When a VM clone is created, a query to the host module is triggered to fetch the identifiers from the host module. The cloud agent of the VM clone compares the fetched identifiers with the persisted identifiers. When the fetched identifiers differ (e.g., in the case of a cloned VM) from the persistent identifiers, the cloud agent will fire a re-registration request to the cloud security monitoring service using a new device ID. In registration response, the cloud service sends the cloud agent a new registration ID. The clone VM can then use the new device ID and registration ID to uniquely identify the clone VM (i.e., differently than the parent VM) in subsequent communications with the cloud security monitoring service.

Figure 1:
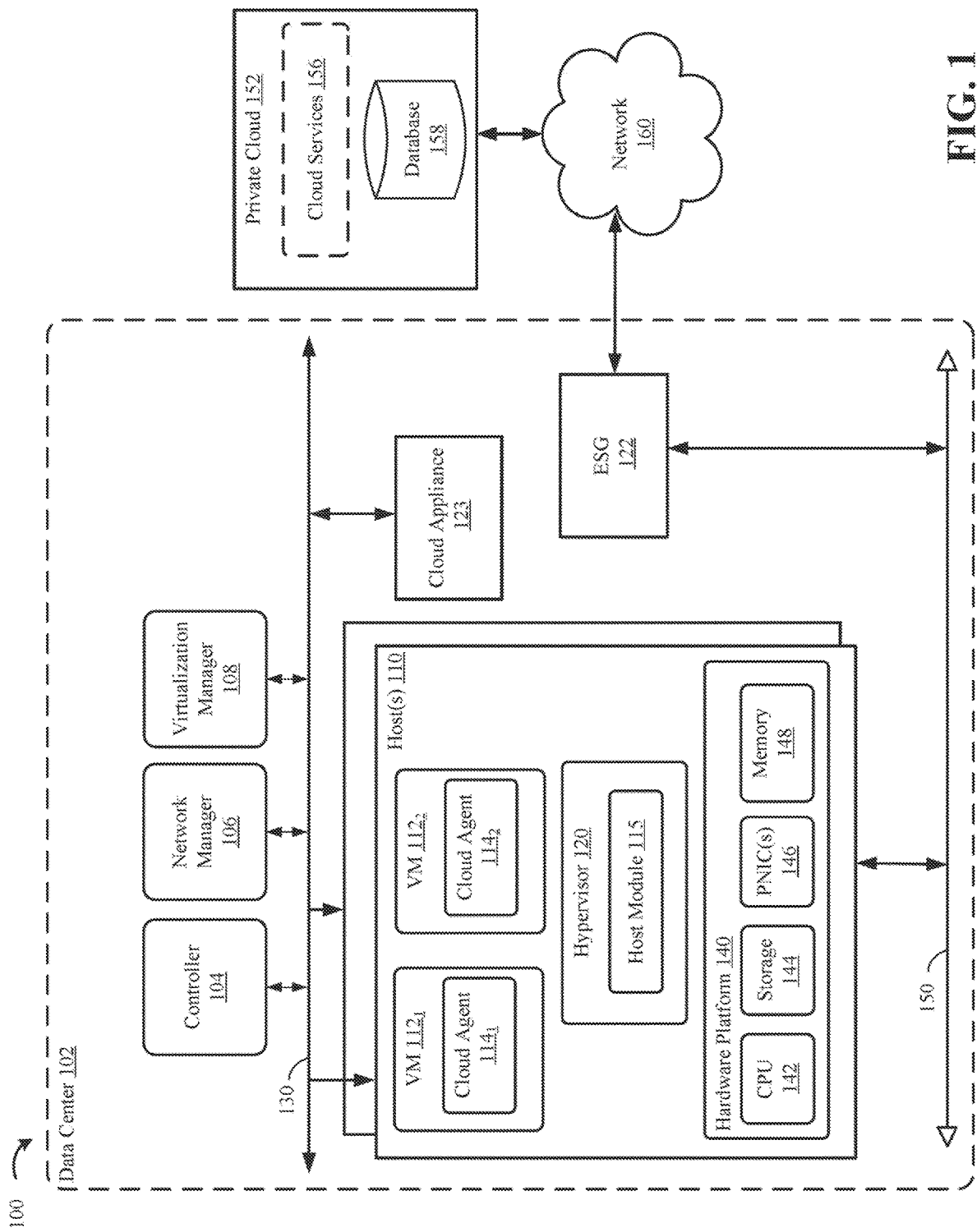
FIG. 1 depicts example physical and virtual components in a networking environment in which embodiments of the present disclosure may be implemented.

FIG. 1 depicts example physical and virtual network components in a networking environment 100 in which embodiments of the present disclosure may be implemented. As shown in FIG. 1, networking environment 100 may be distributed across a hybrid cloud. A hybrid cloud is a type of cloud computing that combines on-premises infrastructure, e.g., a private cloud 152 comprising one or more physical computing devices (e.g., running one or more VCIs) on which the processes shown run, with a public cloud, or data center 102, comprising one or more physical computing devices (e.g., running one or more VCIs) on which the processes shown run. Hybrid clouds allow data and applications to move between the two environments. Many organizations choose a hybrid cloud approach due to organization imperatives such as meeting regulatory and data sovereignty requirements, taking full advantage of on-premises technology investment, or addressing low latency issues.

Data center 102 and private cloud 152 may communicate via a network 160. Network 160 may be an external network. Network 160 may be a layer 3 (L3) physical network. Network 160 may be a public network, a wide area network (WAN) such as the Internet, a direct link, a local area network (LAN), another type of network, or a combination of these.

Data center 102 includes one or more hosts 110, an edge services gateway (ESG) 122, a management network 130, a data network 150, a controller 104, a network manager 106, and a virtualization manager 108. Data network 150 and management network 130 may be implemented as separate physical networks or as separate virtual local area networks (VLANs) on the same physical network.

Host(s) 110 may be communicatively connected to both data network 150 and management network 130. Data network 150 and management network 130 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Each of hosts 110 may be constructed on a server grade hardware platform 140, such as an x86 architecture platform. Hosts 110 may be geographically co-located servers on the same rack or on different racks. Hardware platform 140 of a host 110 may include components of a computing device such as one or more processors (CPUs) 142, storage 144, one or more network interfaces (e.g., physical network interface cards (PNICs) 146), memory 148, and other components (not shown). A CPU 142 is configured to execute instructions, for example, executable instructions that perform one or more operations described herein and that may be stored in the memory and storage system. The network interface(s) enable host 110 to communicate with other devices via a physical network, such as management network 130 and data network 150.

Each host 110 is configured to provide a virtualization layer, also referred to as a hypervisor 120. Hypervisors abstract processor, memory, storage, and networking physical resources of hardware platform 140 into a number of VCIs or VMs 112 on hosts 110. As shown, multiple VMs 112 may run concurrently on the same host 110. In some embodiments, a remote desktop may run on one or more of the VMs 112. In the example shown in FIG. 1, a remote desktop may run on a first VM (e.g., golden VM), VM 1121, and a clone remote desktop may run on a second VM (e.g., clone VM), VM 1122.

As shown in FIG. 1, a VM 112 may include a cloud agent 114. In some embodiments, cloud agent 114 is a Carbon Black sensor. Cloud agent 114 may be configured to receive security policies and rules from private cloud 152 (such as from cloud services 156) and enforce the policies and rules at the VM 112. In some embodiments, cloud agent 114 communicates with private cloud 152 using hypertext transfer protocol (HTTP).

As discussed in more detail below with respect to FIGS. 2-5, cloud agent 114 may be configured to query a host module 115 on hypervisor 120 of host 110 to fetch identifiers from host module 115. In some embodiments, cloud agent 114 communicates with host module 115 using a virtual machine communication interface (VMCI). VMCI is a high-speed interface that VMs on the same host use to communicate with each other and with host kernel modules, circumventing the network layer. Proximity to the host's memory bus makes the communications faster and eliminates latency, and also allows applications to work when network access is restricted or unavailable. VMCI communications may use a VMCI sockets (VSOCK) application programming interface (API) library.

In some embodiments, cloud agent 114 is configured to query host module 115 any time cloud agent 114 detects a reset of the connection with host module 115 (e.g., such as upon creation of a new VM, creation of a clone VM, or upon reconnection of a disconnected VM). Cloud agent 114 may be configured to persist the identifiers, such as to memory 148. As discussed in more detail herein with respect to the FIGS. 2-5, cloud agent 114 may be configured to compare the identifiers fetched from host module 115 to any persisted identifiers and perform a re-registration with private cloud 152 when the fetched identifiers do not match the persisted identifiers. Cloud agent 114 may include the fetched identifiers, in addition to the device ID, in the registration request message to private cloud 152.

Each hypervisor 120 may run in conjunction with an OS in its respective host 110. In some embodiments, a hypervisor can be installed as system level software directly on a hardware platform 140 of its respective host 110 (e.g., referred to as "bare metal" installation) and be conceptually interposed between the physical hardware and the guest OSs executing in the VMs 112.

Hypervisor 120 includes host module 115. In some embodiments, host module 115 is a lightweight host user world module deployed on hypervisor 120. As discussed in more detail below with respect to the FIGS. 205, host module 115 may receive identifiers of VMs 112 from a cloud appliance 123 and provide the respective identifiers to a VM 112 when queried by a cloud agent 114 of the VM 112.

ESG 122 is configured to operate as a gateway device that provides components in data center 102 with connectivity to an external network, such as network 160. ESG 122 may be addressable using addressing of the physical underlay network (e.g., data network 150). ESG 122 may manage external public IP addresses for VMs 112. ESG 122 may include a router (e.g., a virtual router and/or a virtual switch) that routes traffic incoming to and outgoing from data center 102. ESG 122 also provides other networking services, such as firewalls, network address translation (NAT), dynamic host configuration protocol (DHCP), and load balancing. ESG 122 may be referred to as a nested transport node, for example, as the ESG 122 does encapsulation and decapsulation. ESG 122 may be a stripped down version of a Linux transport node, with the hypervisor module removed, tuned for fast routing. The term, "transport node" refers to a virtual or physical computing device that is capable of performing packet encapsulation/decapsulation for communicating overlay traffic on an underlay network. While ESG 122 is illustrated in FIG. 1 as a component outside of host 110, in some embodiments, ESG 122 may be situated on host 110 and provide networking services, such as firewalls, NAT, DHCP, and load balancing services as a service VM (SVM).

Private cloud 152 provides cloud services 156 to data center 102. Cloud agent 114 may communicate with private cloud 152 via ESG 122. Cloud services 156 ingests a variety of data sources that are processed and stored as cybersecurity events, behaviors, and system state metrics that can be analyzed, visualized, and alerted upon for anomaly detection, incident investigation, and remediation of cybersecurity risks. Cloud services 156 can determine policies and rules for network access and publish the policies and rules to cloud agent 114, so that cloud agent 114 can enforce the policies and rules on VM 112.

Data center 102 includes a management plane and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 106 at least in part implements the management plane and controller 104 at least in part implements the control plane The control plane determines the logical overlay network topology and maintains information about network entities such as logical switches, logical routers, and endpoints, etc. The logical topology information is translated by the control plane into network configuration data that is then communicated to network elements of host(s) 110. Controller 104 generally represents a control plane that manages configuration of VMs 112 within data center 102. Controller 104 may be one of multiple controllers executing on various hosts in the data center that together implement the functions of the control plane in a distributed manner. Controller 104 may be a computer program that resides and executes in a central server in the data center or, alternatively, controller 104 may run as a virtual appliance (e.g., a VM) in one of hosts 110. Although shown as a single unit, it should be understood that controller 104 may be implemented as a distributed or clustered system. That is, controller 104 may include multiple servers or virtual computing instances that implement controller functions. It is also possible for controller 104 and network manager 106 to be combined into a single controller/manager. Controller 104 collects and distributes information about the network from and to endpoints in the network. Controller 104 is associated with one or more virtual and/or physical CPUs (not shown). Processor(s) resources allotted or assigned to controller 104 may be unique to controller 104, or may be shared with other components of the data center. Controller 104 communicates with hosts 110 via management network 130, such as through control plane protocols. In some embodiments, controller 104 implements a central control plane (CCP).

Network manager 106 and virtualization manager 108 generally represent components of a management plane comprising one or more computing devices responsible for receiving logical network configuration inputs, such as from a user or network administrator, defining one or more endpoints (e.g., VCIs) and the connections between the endpoints, as well as rules governing communications between various endpoints.

In some embodiments, virtualization manager 108 is a computer program that executes in a central server in the data center (e.g., the same or a different server than the server on which network manager 106 executes), or alternatively, virtualization manager 108 runs in one of VMs 112. Virtualization manager 108 is configured to carry out administrative tasks for the data center, including managing hosts 110, managing VMs running within each host 110, provisioning VMs, transferring VMs from one host to another host, transferring VMs between data centers, transferring application instances between VMs or between hosts 110, and load balancing among hosts 110 within the data center. Virtualization manager 108 takes commands as to creation, migration, and deletion decisions of VMs and application instances on the data center. However, virtualization manager 108 also makes independent decisions on management of local VMs and application instances, such as placement of VMs and application instances between hosts 110. In some embodiments, virtualization manager 108 also includes a migration component that performs migration of VMs between hosts 110, such as by live migration.

In some embodiments, network manager 106 is a computer program that executes in a central server in networking environment 100, or alternatively, network manager 106 may run in a VM, e.g., in one of hosts 110. Network manager 106 communicates with host(s) 110 via management network 130. Network manager 106 may receive network configuration input from a user or an administrator and generate desired state data that specifies how a logical network should be implemented in the physical infrastructure of the data center. Network manager 106 is configured to receive inputs from an administrator or other entity, e.g., via a web interface or application programming interface (API), and carry out administrative tasks for the data center, including centralized network management and providing an aggregated system view for a user.

Data center 102 includes a cloud appliance 123. Cloud appliance 123 may run on a VM external to host 110. In some embodiments, cloud appliance 123 may run on virtualization manager 108. Cloud appliance 123 is configured to provide identifiers of VM(s) 112 to host module 115. In some embodiments, cloud appliance 123 provides host module 115 with, for each VM 112, a unique identifier of the VM (e.g., a "VMuuid") and a unique identifier of virtualization manager 108 (e.g., a "Muuid").

Figure 2:
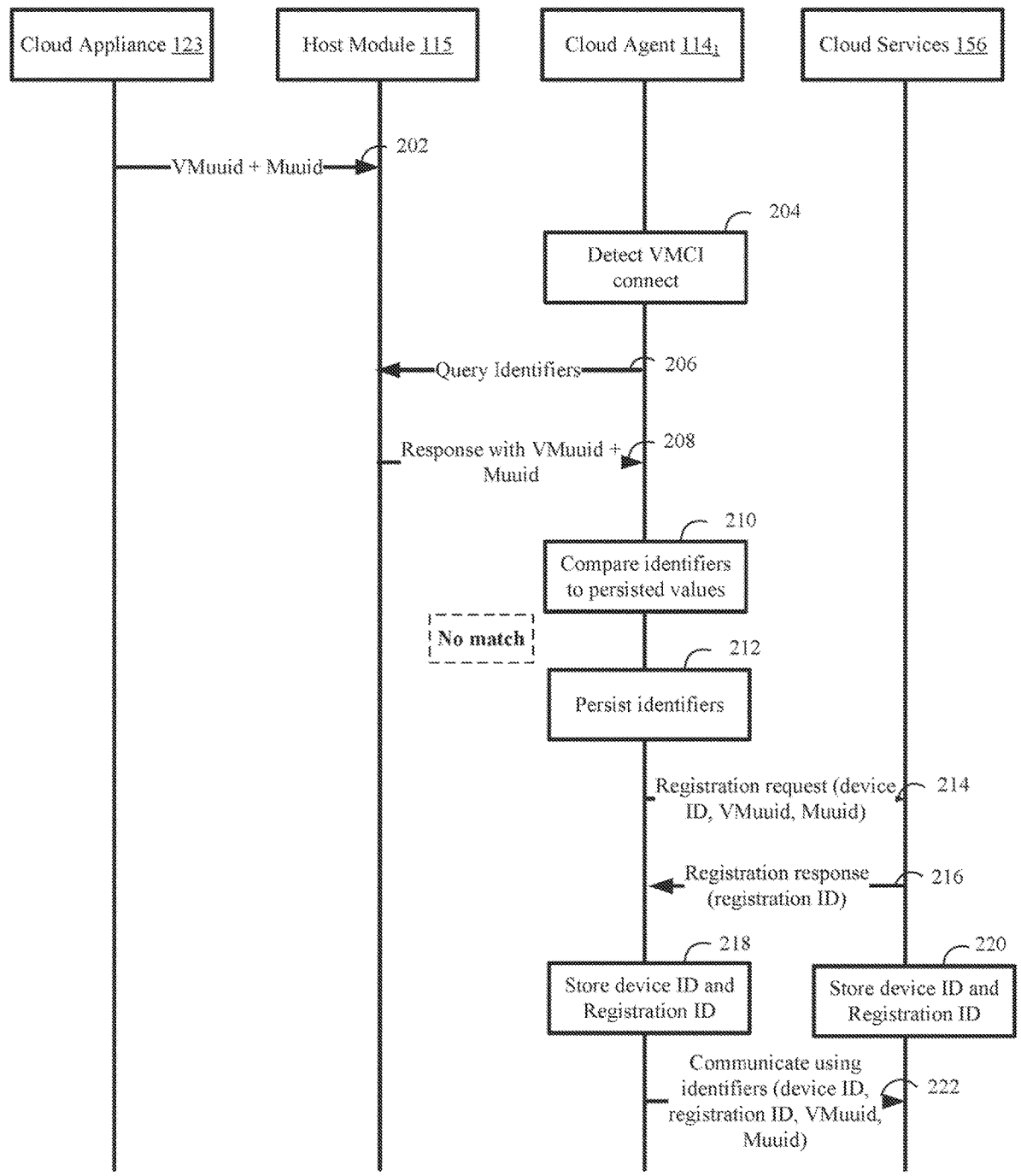
FIG. 2 illustrates an example call flow for registering a new VM with a cloud security monitoring service, according to an example embodiment of the present application.

FIG. 2 illustrates an example call flow 200 for registering a new VM (i.e., a golden VM) with a cloud security monitoring service, according to an example embodiment of the present application.

At operation 202, cloud appliance 123 provides identifiers to host module 115 running on hypervisor 120. In some embodiments, cloud appliance 123 provides the identifiers to host module 115 via an API call. In some embodiments, the identifiers include, for each VM 112 running on the host 110 on which host module 115 is running, a unique identifier of the VM 112 (e.g., VMuuid) and a unique identifier of the virtual manager 108 (e.g., Muuid) associated with the VM 112.

When VM $112_1$ is created, a communication channel is established between cloud agent $114_1$, and the host module 115 running on the hypervisor 120 of the host 110. In some embodiments, the communication channel is a VMCI. At operation 204, cloud agent 114 detects the VMCI connection.

In some embodiments, cloud agent $114_1$ is configured to trigger a query to host module 115 when cloud agent $114_1$ detects a VMCI connection (e.g., a disconnection, reconnection, or connection of the VMCI). Accordingly, the detection of the VMCI connection, at operation 204, may trigger cloud agent $114_1$ to query, at operation 206, host module 115 for first identifiers of the VM $112_1$.

At operation 208, host module 115 responds to the query with the first identifiers configured by cloud appliance 123 (at operation 204) for the VM $112_1$ associated with cloud agent $114_1$. For example, host module 115 provides the VMuuid and Muuid of VM $112_1$ to cloud agent $114_1$.

At operation 210, cloud agent $114_1$ compares the fetched first identifiers to any persisted second identifiers. In this example, because the new VM is the golden VM, there are not any matching persisted second identifiers.

Because there are not any persisted second identifiers matching the fetched first identifiers, at operation 212, cloud agent $114_1$ persists the first identifiers. For example, cloud agent $114_1$ may persist the VMuuid and Muuid on the VM disk (VMDK) of VM $112_1$ in a persistent memory location, such as in memory 148.

At operation 214, cloud agent 114 sends a registration request to cloud services 156. In the illustrated example, because the VM is a golden VM, the VM does not have an existing device ID and registration ID and, therefore, performs registration with cloud services 156. Cloud agent 114 includes a device ID in the registration request message sent to cloud services 156. In some embodiments, the device ID is a randomly generated ID by cloud agent 114. In some embodiments, cloud agent 114 includes the first identifiers (e.g., VMuuid and Muuid) fetched from host module 115 in the registration request message in addition to the device ID.

At operation 216, cloud services 156 sends cloud agent $114_1$ a registration response including a registration ID.

At operation 218, cloud agent $114_1$ stores the device ID and registration ID and, at operation 220, cloud services 156 also stores the device ID and registration ID. Cloud agent $114_1$ may store the device ID and registration ID in storage 144. In some embodiments, cloud services 156 stores the VMuuid and Muuid in addition to the device ID and registration ID. Cloud services 156 may store the identifiers in database 158.

At operation 222, cloud agent $114_1$ subsequently communicates with cloud services 156 using the device ID and registration ID pair. In some embodiments, cloud agent $114_1$ also includes the fetched first identifiers (e.g., VMuuid and Muuid) in subsequent communications with cloud services 156. Cloud services 156 may use the VMuuid and Muuid to identify a communication coming from a VM 112 as associated with a particular virtualization manager 108. Cloud services 156 may monitor for communications from cloud agent $114_1$ using the stored device ID and registration ID. For example, cloud services 156 may monitor communications from cloud agent $114_1$ and collect information about VM $112_1$, process the data to detect cybersecurity events, behaviors, and/or system state metrics, to provide analysis, visualizations, alerts, and/or remediation for detected anomalies, incidents, vulnerabilities, suspicious activities, and/or malware.

Figure 3:
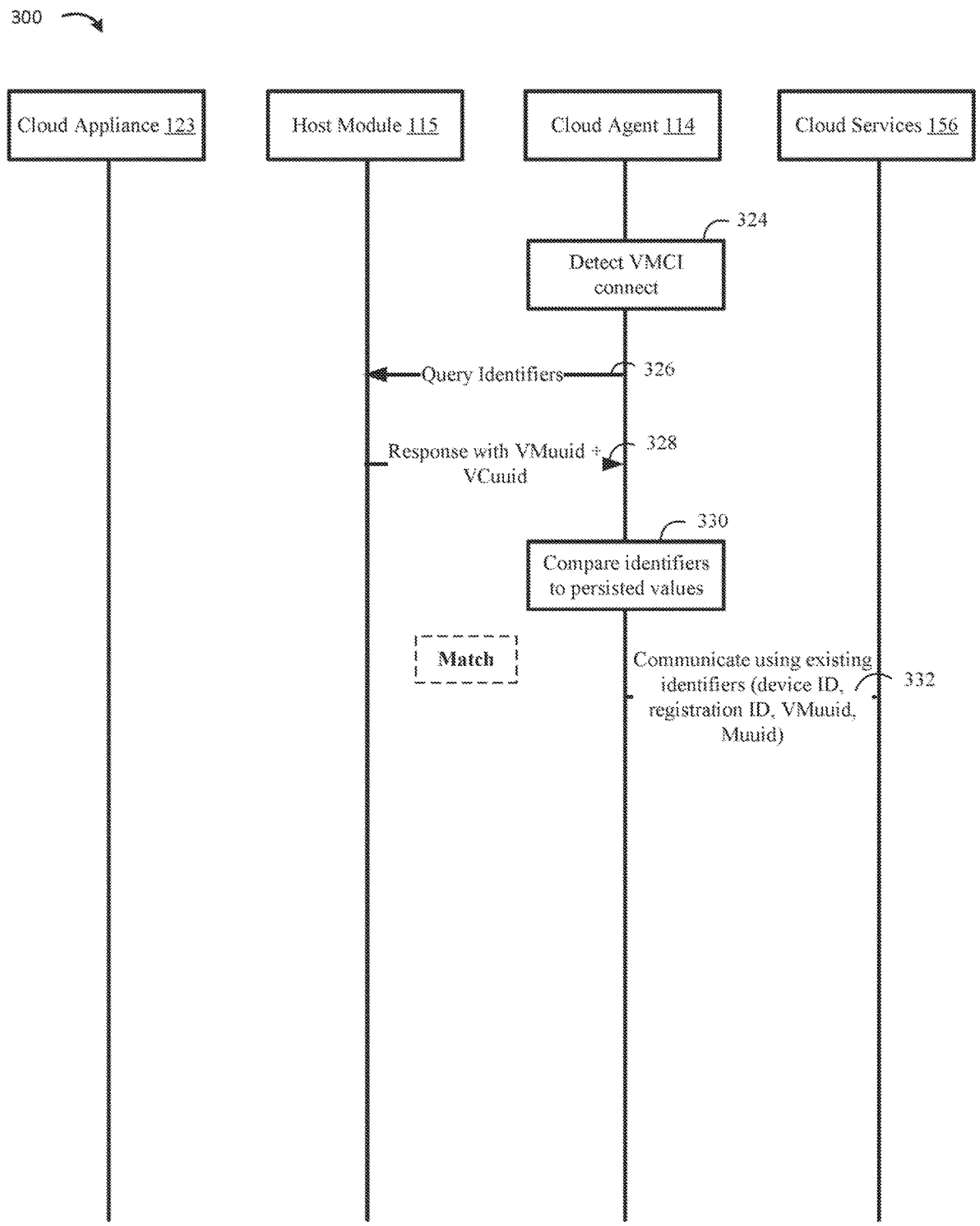
FIG. 3 illustrates an example call flow for a reconnected VM communicating with a cloud security monitoring service, according to an example embodiment of the present application.

FIG. 3 illustrates an example call flow 300 for a reconnected VM communicating with a cloud security monitoring service, according to an example embodiment of the present application.

In some embodiments, after performing the registration with cloud services 156, shown in call flow 200 in FIG. 2, a VM 112 may become disconnected and subsequently reconnect. In some embodiments, a registered golden VM $112_1$ or a registered clone VM 1122 may become disconnected. In some embodiments, VM 112 may become disconnected when the sensor running on the VM is upgraded to a higher version sensor. When VM 112 reconnects, cloud agent 114 re-establishes the VMCI connection with host module 115. At operation 324, cloud agent 114 detects the VMCI reconnection. Based on detecting the reconnection of the VMCI, cloud agent 114 is triggered to query host module 115, operation 326, for third identifiers of the VM 112.

At operation 328, host module 115 responds with the third identifiers. Because the VM was previously connected, the VM is the still the same VM and host module 115 provides the same third identifiers as the first identifiers fetched at operation 208 and previously persisted at operation 212. Accordingly, when cloud agent 114 compares the fetched third identifiers to persisted fourth identifiers (which includes the previously persisted first identifiers), at operation 330, cloud agent 114 determines that the fetched third identifiers match the persisted fourth identifiers (i.e., indicating that the VM is not a new clone VM).

In this case, the VM is determined to be the same VM that previously registered with cloud services 156 and does not need to re-register. At operation 332, cloud agent 114 continues subsequent communications with cloud services 156 using the persisted first identifiers (VMuuid, Muuid) and the device ID and registration ID pair previously received (at operation 216) and stored (at operation 218).

Figure 4:
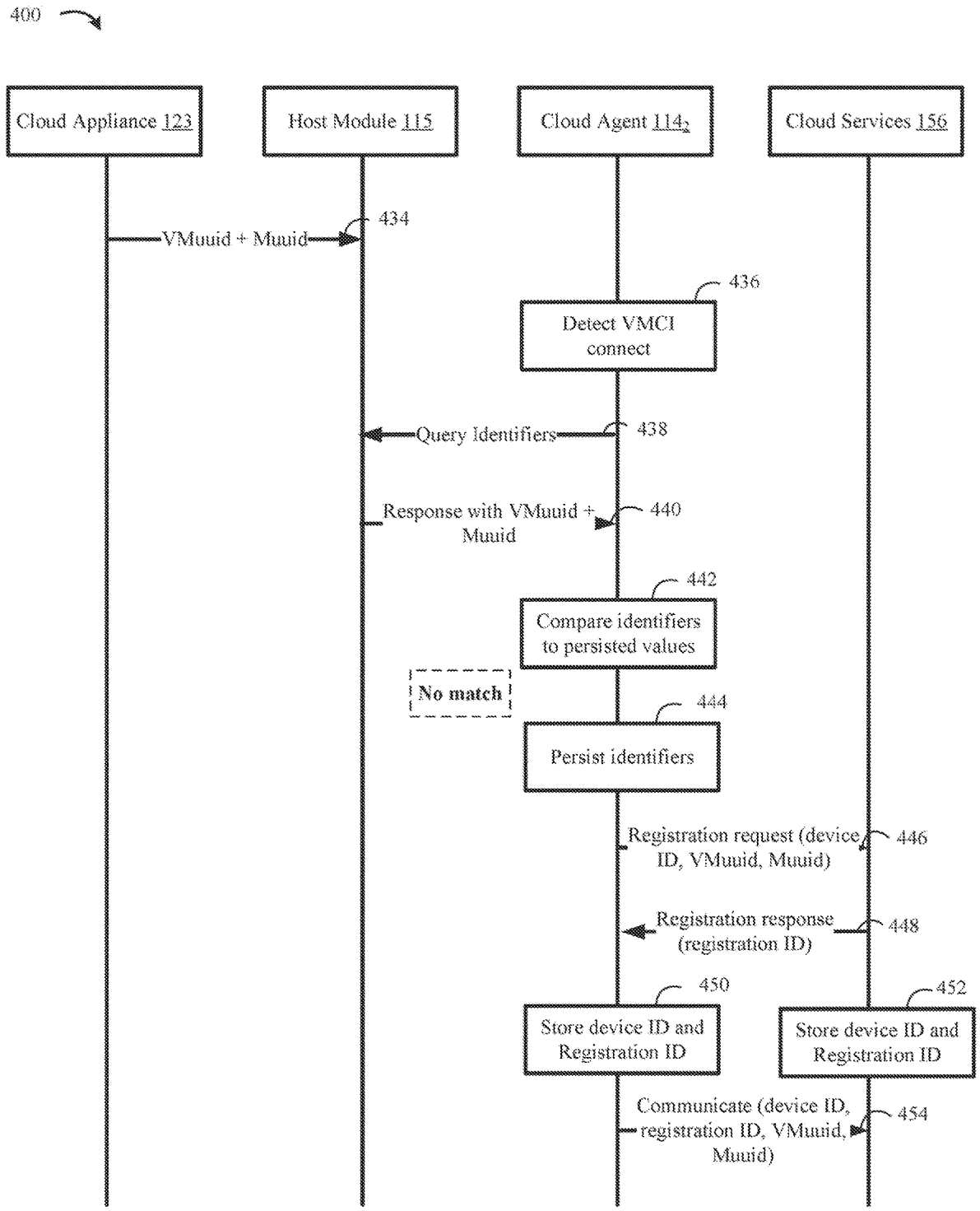
FIG. 4 illustrates an example call flow for auto-reregistering a clone VM with a cloud security monitoring service, according to an example embodiment of the present application.

FIG. 4 illustrates an example call flow 400 for re-registering a new clone VM with a cloud security monitoring service, according to an example embodiment of the present application. As discussed above, a VM may be cloned. For illustrative purposes, the VM clone discussed with respect to FIG. 4 may be a clone of the golden VM discussed with respect to FIG. 2.

At operation 434, cloud appliance 123 provides identifiers (e.g., VMuuid and Muuid) of clone VM 1122 to host module 115 when the clone VM 1122 is created. Because clone VM 1122 is different than the golden VM $112_1$, host module 115 provides different identifiers to host module 115, at operation 434, than the identifiers provided to host module 115 at operation 202 for the golden VM $112_1$.

When a VM clone is created, cloud agent 1142 on the clone VM resets the VMCI connection with host module 115. At operation 436, cloud agent 1142 detects the VMCI connection. Based on detecting the VMCI connection, cloud agent 1142 is triggered to query host module 115 for the identifiers, at operation 438. At operation 440, host module 115 responds with the identifiers for the clone VM 1122 (e.g., the identifiers received from cloud appliance 123 at operation 434). Because the clone VM 1122 is a new VM (not the golden VM $112_1$), the identifiers provided by the host module 115 for clone VM $112_2$, at operation 440, are different than the identifiers provided by the host module 115 for the golden VM $112_1$ (at operation 210). Accordingly, when cloud agent $114_2$ compares the fetched identifiers with the persisted values (e.g., the identifiers persisted at operation 212), at 442, cloud agent $114_2$ determines the fetched identifiers do not match any persisted values.

Based on determining the fetched identifiers do not match any persisted values (e.g., indicating the VM is a clone), cloud agent $114_2$ persists the fetched identifiers, at operation 444, and is triggered to perform a reregistration with cloud services 156. In some embodiments, cloud agent $114_2$ is triggered to perform a reregistration by cloud services 156. For example, cloud agent $114_2$ may send a device status message to cloud services 156 including the fetched identifiers. Cloud services 156 may send cloud agent $114_2$ a device status response message including a reregistration hint (e.g., an indication for cloud agent $114_2$ to re-register with cloud services 156). Cloud services 156 may include the reregistration hint when the identifiers included in the device status message from cloud agent $114_2$ are different than identifiers stored by cloud services 156 for the device ID and registration ID pair.

At operation 446, cloud agent $114_2$ sends a reregistration request to cloud services 156. Cloud agent $114_2$ includes a new device ID in the reregistration request. For example, based on determining, at operation 442, that the fetched identifiers do not match any persisted values, cloud agent $114_2$ generates a new device ID. In some embodiments, cloud agent $114_2$ includes the fetched identifiers in addition to the device ID in the reregistration request.

At operation 448, cloud services 156 sends cloud agent $114_2$ a reregistration response with a new registration ID (i.e., different than the registration ID provided to cloud agent $114_1$ at operation 216).

At operation 450, cloud agent $114_2$ stores the new device ID and the new registration ID (e.g., such as in storage 144) and, at operation 452, cloud services 156 stores the new device ID and the new registration ID (e.g., in database 158). In some embodiments, cloud services 156 also stores the VMuuid and the Muuid in addition to the new device ID and new registration ID. Accordingly, for subsequent communications with cloud services 156, at operation 454, cloud agent $114_2$ uses the new device ID and registration ID pair. In some embodiments, cloud agent $114_2$ further includes the fetched identifiers in the subsequent communications.

As mentioned above, Cloud services 156 may use the VMuuid and Muuid to associate a VM 112 with a particular virtualization manager 108. In some embodiments, a VM 112 is moved to a different host 110 serviced by a different virtualization manager 108. In this case, the VMCI connection will be reset and the cloud agent 114 for the VDI will query host module 115 for the identifiers of the migrated VM 112. Because the VM 112 is the same VM, in some embodiments, host module 115 will return the same identifier of the VM (i.e., the VMuuid) and only the identifier of the virtual manager 108 (i.e., the Muuid) will be different. Thus, cloud agent 132 will not re-register with cloud services 156. In some embodiments, the identifier of the VM changes, in addition to the identifier of the virtualization manager 108, when the VM is moved. In this case, cloud agent 114 reregisters with cloud services 156. Accordingly, in some embodiments, cloud agent 114 is triggered to perform a reregistration with cloud services 156 only when the VMuuid does not match any persisted values.

Figure 5:
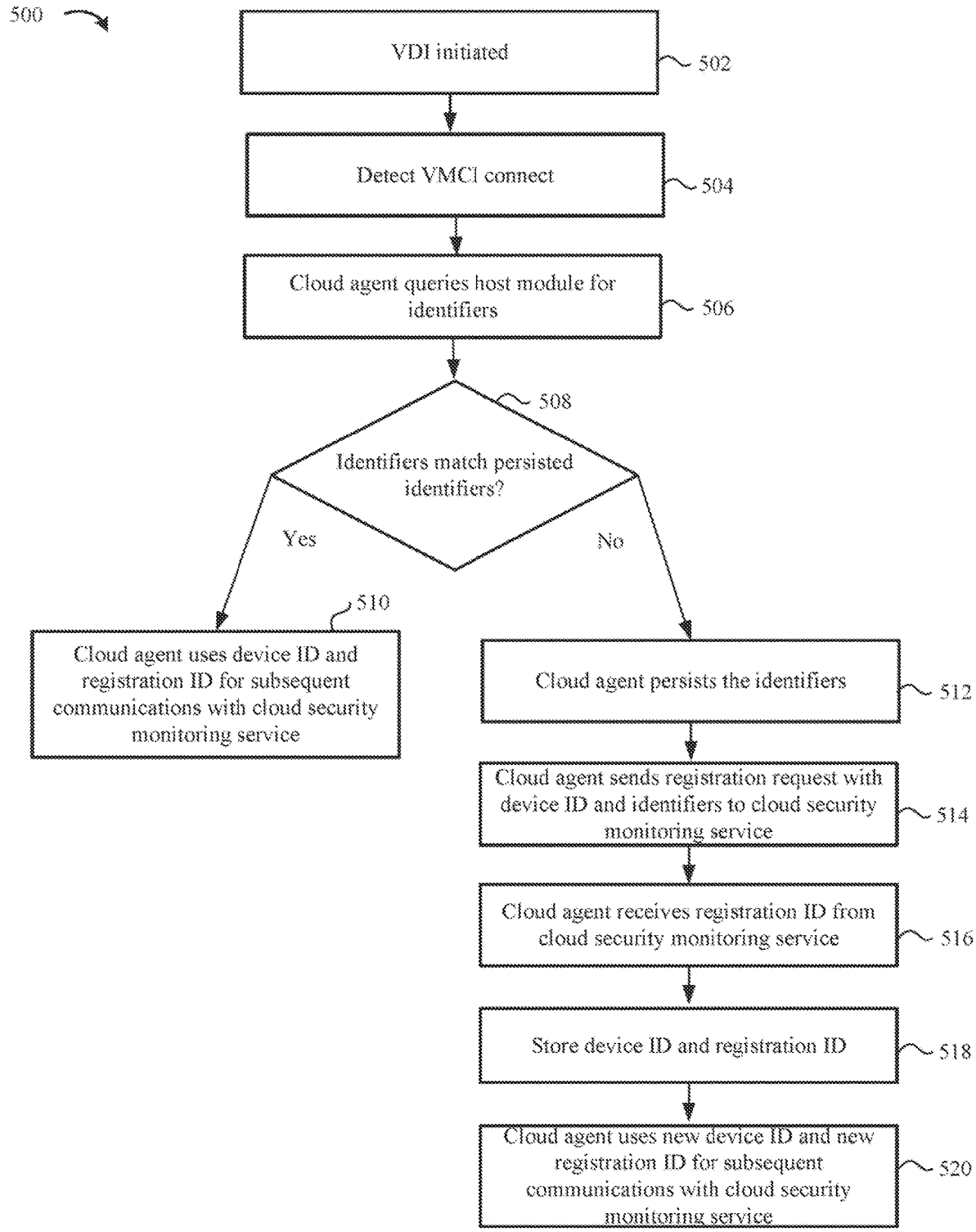
FIG. 5 illustrates an example workflow for registering a VM with a cloud security monitoring service, according to an example embodiment of the present application.

FIG. 5 illustrates an example workflow 500 for registering a VM with a cloud security monitoring service, according to an example embodiment of the present disclosure. Workflow 500 of FIG. 5 may be performed, for example, by components of networking environment 100 illustrated in FIG. 1

Workflow 500 may begin, at operation 502, by initiating a VM. In some embodiments, initiating the VM includes installing a remote desktop on a VM $112_1$. In some embodiments, initiating the VM includes reconnecting VM $112_1$ after a disconnection (e.g., to upgrade the sensor version). In some embodiments, initiating the VM includes cloning VM $112_2$ to create clone VM $112_2$. In some embodiments, initiating the VM includes reconnecting clone VM $112_2$ after a disconnection (e.g., to upgrade the clone sensor version).

At operation 504, a VMCI connection is detected. In some embodiments, a cloud agent $114_1$ detects an established VMCI connection with host module 115 after a new golden VM $112_1$ is created. In some embodiments, cloud agent $114_1$ detects a reset of the VMCI connection with host module 115 after the golden VM $112_1$ is reconnected after a previous disconnection. In some embodiments, a cloud agent $114_2$ detects a reset VMCI connection with host module 115 after a clone VM $112_2$ is created or reconnected after a previous disconnection.

At operations 506, cloud agent 114 queries host module 115 for identifiers. For example, based on detecting the VMCI connect, at operation 504, cloud agent 114 queries host module 115 for the VMuuid and Muuid for VM 112.

At operation 508, cloud agent 114 compares the fetched identifier to persisted identifiers to determine whether the fetched identifiers match any persisted identifiers.

Cloud agent 114 may determine that the fetched identifiers match persisted identifiers. For example, where the VM is a golden VM or clone VM that previously disconnected and has now reconnected, then fetched identifiers will match persisted identifiers. That is, cloud agent 114 will have previously fetched and persisted identifiers for the VM 112 and, because the reconnected VM is the same VM, the newly fetched identifiers will be the same as the previously fetched and persisted identifiers. Accordingly, cloud agent 114 does not need to reregister with cloud services 156 and, at operation 510, uses the existing device ID, registration ID, and identifiers for subsequent communications with cloud services 156.

Cloud agent 114 may determine that the fetched identifiers do not match persisted identifiers. For example, where the VM is a new golden VM or new clone VM the fetched identifiers will not match any persisted identifiers. At operation 512, cloud agent 114 persists the fetched identifiers. At operation 514, cloud agent 114 sends a registration request (or a reregistration request for a new clone VM) to cloud services 156 including a newly generated device ID and the fetched identifiers. At operation 516, cloud agent 114 receives a registration response from cloud services 156 including a new registration ID. At operation 518, cloud agent 114 and cloud services 156 each stores the device ID and the registration ID. At operation 520, cloud agent 114 uses the new device ID and the new registration ID for subsequent communication with cloud services 156.

Accordingly, by fetching identifiers from host module 115 when a connection is detected, a clone VM can determine that it is a clone and that it needs to generate a new device ID and reregister with the cloud security monitoring service to obtain a new registration ID. With the new device ID and registration ID pair, the clone VM can be uniquely identified and differentiated from the parent VM by the cloud security monitoring service. Thus, the cloud security monitoring service can identify the source of events reported to the cloud security monitoring services and take appropriate remediation steps.

Figure 6:
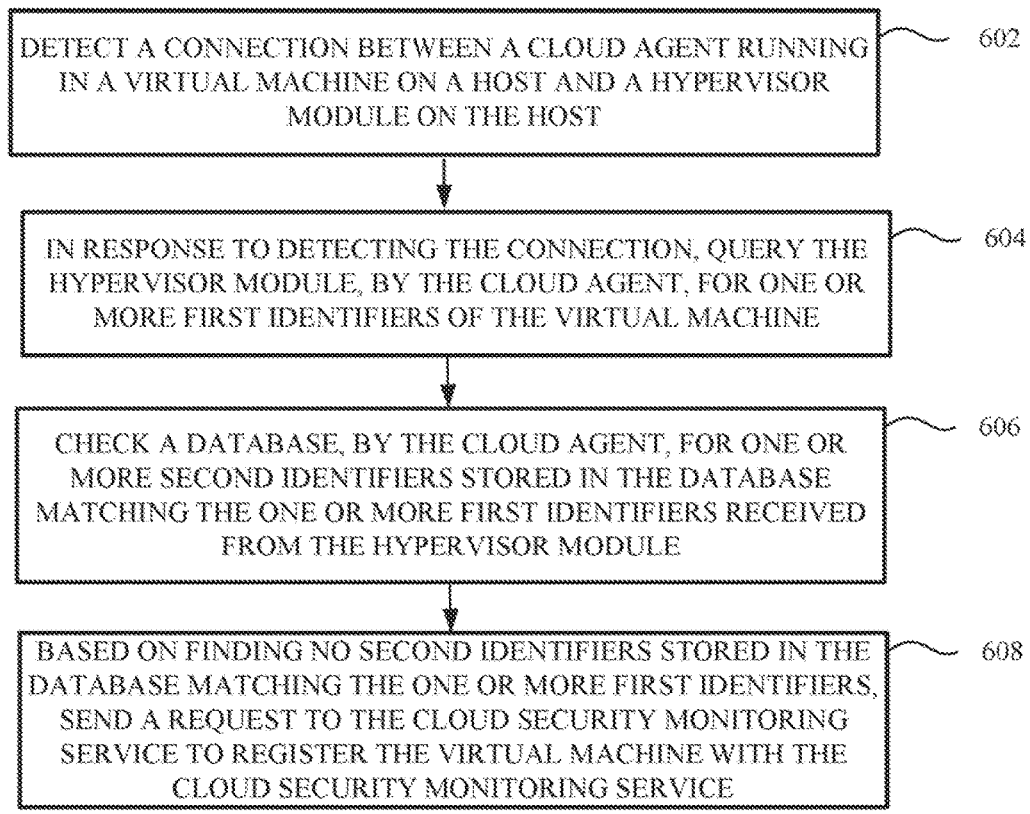
FIG. 6 illustrates an example flow diagram for registering a VM with a cloud security monitoring service, according to an example embodiment of the present application.

FIG. 6 illustrates an example flow diagram 600 for registering a VM with a cloud security monitoring service, according to an example embodiment of the present application. In embodiments, operations illustrated in flow diagram 600 may be performed by a cloud agent, such as a cloud agent 114.

The operations may begin, at block 602, by detecting a connection between a cloud agent running in a virtual machine on a host (e.g., such as a host 110) and a hypervisor module (e.g., such as host module 115 on hypervisor 120) on the host. The cloud agent may be cloud agent $114_1$ of VM $112_1$ or cloud agent $114_2$ of VM $112_2$.

At 604, in response to detecting the connection (e.g., a VMCI connection), the cloud agent queries the hypervisor module for one or more first identifiers of the virtual machine. In some embodiments, the one or more first identifiers comprise a VM identifier (e.g., VMuuid) and an identifier of a virtualization manager (e.g. Muuid) associated with the VM $112_1$ or the VM $112_2$.

At 606, the cloud agent checks a database for one or more second identifiers stored in the database matching the one or more first identifiers received from the hypervisor module. For example, cloud agent $114_1$ or cloud agent $114_2$ checks in a database for persisted VMuuids and Muuids (the one or more second identifiers), to determine whether the database includes a VMuuid and Muuid that matches the VMuuid and Muuid fetched from host module 115 (the one or more first identifiers).

At 608, based on finding no second identifiers stored in the database matching the one or more first identifiers, the cloud agent sends a request to a cloud security monitoring service (e.g., cloud services 156) to register the virtual machine with the cloud security monitoring service.

In some embodiments, based on finding no second identifiers stored in the database matching the one or more first identifiers, the cloud agent randomly generates a device ID. The request to the cloud security monitoring service includes at least the device ID. In some embodiments, the virtual machine comprises a clone of another virtual machine, wherein the other virtual machine previously registered with the cloud security monitoring service.

In some embodiments, the cloud agent receives, from the cloud security monitoring service, a response including a registration ID. In some embodiments, the cloud agent includes the device ID, the registration ID, and the one or more first identifiers in subsequent communications with the cloud security monitoring service.

In some embodiments, the cloud security monitoring service monitors the subsequent communications, collects security information associated with the virtual machine based on the subsequent communications, and generates one or more security alerts based on the security information.

In some embodiments, based on find finding no second identifiers stored in the database matching the one or more first identifiers, the cloud agent persists the one or more first identifiers in the database.

In some embodiments, the cloud agent detects a reconnection between the cloud agent running in the virtual machine on the host and the hypervisor module on the host. In response to detecting the connection, the cloud agent queries the hypervisor module for one or more third identifiers of the virtual machine, where the one or more third identifiers are the one or more first identifiers. The cloud agent checks a database for one or more fourth identifiers stored in the database matching the one or more third identifiers received from the hypervisor module, where the one or more fourth identifiers includes the one or more first identifiers. Based on finding one or more fourth identifiers stored in the database matching the one or more third identifiers, the cloud agent communicates with the cloud service using a previously obtained device ID and registration ID. For example, VM $112_1$ or VM $112_2$ may cloud agent $114_1$ or cloud agent $114_2$ may become disconnected and subsequently reconnect. When VM $112_1$ or VM $112_2$ reconnects, cloud agent $114_1$ or cloud agent $114_2$ detects a VMCI connection with host module 115 and queries host module 115 for identifiers (the third identifiers) of VM $112_1$ or VM $112_2$. Because VM $112_1$ or VM $112_2$ is the same VM that previously connected, host module 115 provides the first one or more identifiers to cloud agent $114_1$ or cloud agent $114_2$. When cloud agent $114_1$ or cloud agent $114_2$ checks the identifiers persisted in the database (the one or more fourth identifiers), the identifiers include the previously persisted one or more first identifiers of VM $112_1$ or VM $112_2$ matching the one or more third identifiers fetched from host module 115.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can be a non-transitory computer readable medium. The computer readable medium can also be distributed over a network coupled computer system so that the computer readable code is stored and executed in a distributed fashion. In particular, one or more embodiments may be implemented as a non-transitory computer readable medium comprising instructions that, when executed by one or more processors of a computing system, cause the computing system to perform a method, as described herein.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

What is claimed is:

1. A method for registering with a cloud security monitoring service, the method comprising:
    detecting a connection between a cloud agent running in a virtual machine on a host and a hypervisor module on the host;
    in response to detecting the connection, querying the hypervisor module, by the cloud agent, for one or more first identifiers of the virtual machine;
    checking a database, by the cloud agent, for one or more second identifiers stored in the database matching the one or more first identifiers received from the hypervisor module; and
    based on finding no second identifiers stored in the database matching the one or more first identifiers, sending a request to the cloud security monitoring service to register the virtual machine with the cloud security monitoring service.

2. The method of claim 1, wherein the one or more first identifiers comprise a virtual machine identifier and an identifier of a virtualization manager associated with the virtual machine.

3. The method of claim 1, wherein the virtual machine comprises a clone of another virtual machine, and wherein the other virtual machine previously registered with the cloud security monitoring service.

4. The method of claim 1, further comprising:
    based on finding no second identifiers stored in the database matching the one or more first identifiers, persisting the one or more first identifiers in the database.

5. The method of claim 1, further comprising:
    based on finding no second identifiers stored in the database matching the one or more first identifiers, randomly generating a device identifier (ID), wherein the request to the cloud security monitoring service includes at least the device ID; and
    receiving, from the cloud security monitoring service, a response including a registration ID.

6. The method of claim 5, further comprising:
    detecting a reconnection between the cloud agent running in the virtual machine on the host and the hypervisor module on the host;
    in response to detecting the reconnection, querying the hypervisor module, by the cloud agent, for one or more third identifiers of the virtual machine, wherein the one or more third identifiers comprise the one or more first identifiers;
    checking a database, by the cloud agent, for one or more fourth identifiers stored in the database matching the one or more third identifiers received from the hypervisor module, wherein the one or more fourth identifiers includes the one or more first identifiers; and
    based on finding one or more first identifiers stored in the database matching the one or more third identifiers, communicating with the cloud security monitoring service using the device ID and registration ID.

7. The method of claim 5, further comprising:
    including, by the cloud agent, the device ID, the registration ID, and the one or more first identifiers in subsequent communications with the cloud security monitoring service.

8. The method of claim 7, further comprising:
    monitoring, by the cloud security monitoring service, the subsequent communications;
    collecting, by the cloud security monitoring service, security information associated with the virtual machine based on the subsequent communications; and
    generating, by the cloud security monitoring service, one or more security alerts based on the security information.

9. A system comprising:
    one or more processors; and
    at least one memory, the one or more processors and the at least one memory configured to:
        detect a connection between a cloud agent running in a virtual machine on a host and a hypervisor module on the host;
        in response to detecting the connection, query the hypervisor module, by the cloud agent, for one or more first identifiers of the virtual machine;
        check a database, by the cloud agent, for one or more second identifiers stored in the database matching the one or more first identifiers received from the hypervisor module; and
        based on finding no second identifiers stored in the database matching the one or more first identifiers, send a request to a cloud security monitoring service to register the virtual machine with the cloud security monitoring service.

10. The system of claim 9, wherein the one or more first identifiers comprise a virtual machine identifier and an identifier of a virtualization manager associated with the virtual machine.

11. The system of claim 9, wherein the virtual machine comprises a clone of another virtual machine, and wherein the other virtual machine previously registered with the cloud security monitoring service.

12. The system of claim 9, the one or more processors and the at least one memory further configured to:
    based on finding no second identifiers stored in the database matching the one or more first identifiers, persist the one or more first identifiers in the database.

13. The system of claim 9, the one or more processors and the at least one memory further configured to:
    based on finding no second identifiers stored in the database matching the one or more first identifiers, randomly generate a device identifier (ID), wherein the request to the cloud security monitoring service includes at least the device ID; and
    receive, from the cloud security monitoring service, a response including a registration ID.

14. The system of claim 13, the one or more processors and the at least one memory further configured to:
- detect a reconnection between the cloud agent running in the virtual machine on the host and the hypervisor module on the host;
- in response to detecting the reconnection, query the hypervisor module, by the cloud agent, for one or more third identifiers of the virtual machine, wherein the one or more third identifiers comprise the one or more first identifiers;
- check a database, by the cloud agent, for one or more fourth identifiers stored in the database matching the one or more third identifiers received from the hypervisor module, wherein the one or more fourth identifiers includes the one or more first identifiers; and
- based on finding one or more first identifiers stored in the database matching the one or more third identifiers, communicating with the cloud security monitoring service using the device ID and registration ID.

15. The system of claim 13, the one or more processors and the at least one memory further configured to:
- include, by the cloud agent, the device ID, the registration ID, and the one or more first identifiers in subsequent communications with the cloud security monitoring service.

16. The system of claim 15, the one or more processors and the at least one memory further configured to:
- monitor, by the cloud security monitoring service, the subsequent communications;
- collect, by the cloud security monitoring service, security information associated with the virtual machine based on the subsequent communications; and
- generate, by the cloud security monitoring service, one or more security alerts based on the security information.

17. A non-transitory computer-readable medium comprising instructions that, when executed by one or more processors of a computing system, cause the computing system to perform operations for registering with a cloud security monitoring service, the operations comprising:
- detecting a connection between a cloud agent running in a virtual machine on a host and a hypervisor module on the host;
- in response to detecting the connection, querying the hypervisor module, by the cloud agent, for one or more first identifiers of the virtual machine;
- checking a database, by the cloud agent, for one or more second identifiers stored in the database matching the one or more first identifiers received from the hypervisor module; and
- based on finding no second identifiers stored in the database matching the one or more first identifiers, sending a request to the cloud security monitoring service to register the virtual machine with the cloud security monitoring service.

18. The non-transitory computer-readable medium of claim 17, the operations further comprising:
- based on finding no second identifiers stored in the database matching the one or more first identifiers, randomly generating a device identifier (ID), wherein the request to the cloud security monitoring service includes at least the device ID; and
- receiving, from the cloud security monitoring service, a response including a registration ID.

19. The non-transitory computer-readable medium of claim 18, the operations further comprising:
- detecting a reconnection between the cloud agent running in the virtual machine on the host and the hypervisor module on the host;
- in response to detecting the reconnection, querying the hypervisor module, by the cloud agent, for one or more third identifiers of the virtual machine, wherein the one or more third identifiers comprise the one or more first identifiers;
- checking a database, by the cloud agent, for one or more fourth identifiers stored in the database matching the one or more third identifiers received from the hypervisor module, wherein the one or more fourth identifiers includes the one or more first identifiers; and
- based on finding one or more first identifiers stored in the database matching the one or more third identifiers, communicating with the cloud security monitoring service using the device ID and registration ID.

20. The non-transitory computer-readable medium of claim 18, the operations further comprising:
- including, by the cloud agent, the device ID, the registration ID, and the one or more first identifiers in subsequent communications with the cloud security monitoring service.

* * * * *